(12) United States Patent
Sasaki et al.

(10) Patent No.: US 7,059,211 B2
(45) Date of Patent: Jun. 13, 2006

(54) RACK-AND-PINION GEAR MECHANISM

(75) Inventors: Eiji Sasaki, Tokyo (JP); Kei Shirahata, Tokyo (JP); Kazutoshi Taniguchi, Tokyo (JP); Takashi Kuzuu, Tokyo (JP); Shoji Tatehata, Tokyo (JP); Tetsurou Nagami, Tokyo (JP); Kiichiro Murotani, Tokyo (JP); Hisashi Morita, Tokyo (JP); Nao Watanabe, Tokyo (JP); Takeshi Inatani, Tokyo (JP); Masaaki Takeshima, Tokyo (JP); Eiji Niikura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 407 days.

(21) Appl. No.: 10/432,238

(22) PCT Filed: Oct. 24, 2001

(86) PCT No.: PCT/JP01/09351

§ 371 (c)(1),
(2), (4) Date: May 22, 2003

(87) PCT Pub. No.: WO03/036135

PCT Pub. Date: May 1, 2003

(65) Prior Publication Data

US 2004/0035235 A1    Feb. 26, 2004

(51) Int. Cl.
F16H 1/04 (2006.01)
F16H 27/02 (2006.01)
F16H 29/02 (2006.01)
F16H 29/20 (2006.01)

(52) U.S. Cl. .................. 74/422; 74/89.17

(58) Field of Classification Search ............. 74/422, 74/424.6, 120, 411, 406, 388 PS; 360/267; 720/675, 676, 663, 664, 665
See application file for complete search history.

(56) References Cited

U.S. PATENT DOCUMENTS

| 1,371,138 | A | * | 3/1921 | Bair ................ 235/60.31 |
| 4,222,282 | A | * | 9/1980 | Taig ..................... 74/457 |
| 4,539,857 | A |   | 9/1985 | Kako et al. |
| 5,889,755 | A | * | 3/1999 | Kim ..................... 720/675 |

FOREIGN PATENT DOCUMENTS

| JP | 41-13134 Y1 | 6/1966 |
| JP | 49-14919 Y1 | 4/1974 |
| JP | 63-176857 A | 7/1988 |
| JP | 1-117977 U | 8/1989 |
| JP | 3-100650 U | 10/1991 |

* cited by examiner

Primary Examiner—Richard W. Ridley
Assistant Examiner—Justin Krause
(74) Attorney, Agent, or Firm—Birch, Stewart, Kolasch & Birch, LLP

(57) ABSTRACT

A rack and pinion gear mechanism includes a rack forming member having a rack; a pinion gear which engages releasably with the rack of rack forming member; and an elastic member which contacts with one portion of the rack forming member and deformed by an elastic deformation corresponding to a displacement of the rack forming member by a confliction of tooth points, the one portion is located opposite side to a tooth of the rack that contacts firstly with a tooth of the pinion gear and the gear mechanism further includes a positioning means to fix the elastic member in a cantilever manner to define a positioning of a free end of the elastic member in height.

4 Claims, 9 Drawing Sheets

RACK-AND-PINION GEAR MECHANISM

This application is the national phase under 35 U.S.C. § 371 of PCT International Application No. PCT/JP01/09351 which has an International filing date of Oct. 24, 2001, which designated the United States of America.

TECHNICAL FIELD

The present invention relates to a rack and pinion gear mechanism by which an engagement and its releasing can be performed between a rack and a pinion gear.

BACKGROUND ART

As a rack and pinion gear mechanism in the prior art technology, it is well known, for example, that is disclosed in Japanese Laid Open Patent Sho 63-176857 patent gazette.

FIG. 1 is a front view to show a constitution of the rack and pinion gear mechanism in the prior art technology which is disclosed in the above mentioned Laid Open patent gazette. In the drawing a reference numeral 1 designates a main body rack, 2 designates a conveying means to carry pinion series 3A, 3B, 3C and the like. The main body rack 1 is fixed on the main body flame by pins 5 and 6. In a pinion introducing side (which is shown as right side in FIG. 1) of the main body rack 1, a introducing segment rack 7 is arranged capable of rocking in vertical direction around a pin 6 as an axis contacting with the main body rack 1. At a junction point 8 of an end portion of the main body rack 1 and an end portion 7A of the introducing segment rack 7, a pitch line 11 in tooth depth direction of the introducing segment rack 7 and a pitch line 13 in tooth depth direction of the main body 1 are matched. And the introducing segment rack 7 is arranged in relation to the main body rack 1 such that a gear pitch 9 of the introducing segment rack 7 at the junction point 8 is made aligned with a gear pitch 10 of the main body rack 1. An end portion 7B of the pinion introducing side of introducing segment rack 7 is held so that the pitch line 11 in tooth depth direction becomes at least lower than the pitch line 13 of tooth depth direction of the main body rack 1 in a predetermined amount 12. At this point the above mentioned amount 12 is maintained by means that a block 15 which is built as one body in the introducing segment rack 7 is pushed against a stop pin 14 by a boost up force of spring 16.

And a distance 20 between the stop pin 14 and an end surface of the end portion 7B of pinion introducing side of the introducing segment rack 7 is set less than one half of the gear pitch. The spring 17 is an elastic member to press the introducing segment rack 7 to the main body rack 1. A force generated in a tooth surfaces when the introducing segment rack 7 and the pinion 3B and the like are engaged, can be absorbed by a displacement and its return in longitudinal direction of the introducing segment rack 7.

Hereinafter operation of the mechanism will be explained.

When the pinion 3B, for example, usually comes from right hand direction of the drawing and arrives on the introducing segment rack 7, a tooth point of the pinion 3B and a tooth point of the introducing segment rack 7 interfere together. At this point the introducing segment rack 7 rocks downward around axis of the pin 6 as a center to absorb the force generated at the tooth points. By this movement disadvantages such as a malfunction of the gear mechanism, a damage of driving motor, a breakage of teeth and the like are prevented.

However in the rack and pinion gear mechanism in the prior art technology there has been a problem that a constitution of the gear mechanism is too complicated because a means to prevent the disadvantages which is generated by a confliction of the tooth points, is composed of the introducing segment rack 7 that moves to a direction to release an engagement when the confliction of tooth points occurs, the spring 16 that always presses the introducing segment rack 7 upward to hold it at a predetermined position and the spring 17 that urges the gears in a direction for the engagement and makes the gears smoothly engaged when the engagement is released.

The present invention has been made to solve the above described problem and it is an object of the invention to provide a rack and pinion gear mechanism by which the disadvantages caused by confliction of the tooth points can be prevented with a simple constitution.

DISCLOSURE OF THE INVENTION

The rack and pinion gear mechanism in accordance with the present invention includes a rack forming member having a rack; a pinion gear which engages releasably with the rack of rack forming member; and an elastic member which contacts with one portion of said rack forming member, which is located opposite side to a tooth of the rack that contacts firstly with a tooth of said pinion gear and is deformed by an elastic deformation corresponding to a displacement of the rack forming member by a confliction of tooth points. By this arrangement an effect is produced that an occurrence of disadvantages such as a damage of driving motor, a breakage of teeth and the like caused by the confliction of tooth points can be avoided, though it has merely a simple constitution in comparison with the gear mechanism in the prior art technology, the elastic member can be deformed by the elastic deformation corresponding to a displacement of the rack forming member having the rack when the confliction of tooth points occurs at very beginning of the engagement.

The rack and pinion gear mechanism in accordance with the present invention is arranged such that the elastic member contacts with the one portion of rack forming member at just before and just after beginning of the engagement between the rack and the pinion gear, and the elastic member is apart from the rack forming member when the engagement is continued. By this arrangement an effect is produced that the rack forming member can be surely reset utilizing an elasticity of the elastic member when it need, and at the same time the contact between the elastic member and the rack forming member can be avoided to suppress the sliding load as low as possible when it does not need.

The rack and pinion gear mechanism in accordance with the present invention further includes a positioning means to fix the elastic member in a cantilever manner to define a positioning of free end of the elastic member in height. By this arrangement an effect is produced that a decrease of durability in operation can be avoidable because a height of the elastic member can be adjusted in order that the elastic member is slightly contacted with one portion of the rack forming member just before and just after beginning of the engagement, and the sliding load of elastic member against the rack forming member can be suppressed as low as possible.

The rack and pinion gear mechanism in accordance with the present invention is arranged such that a tooth of the rack which firstly contacts with a tooth of the pinion gear at the engagement with the pinion gear, is made lower than the other teeth in its height of tooth top. By this arrangement an effect is produced that occurrence of the confliction of tooth points can be decreased and the smooth engagement can be attained.

BEST MODE FOR CARRYING OUT THE INVENTION

Figure 1:
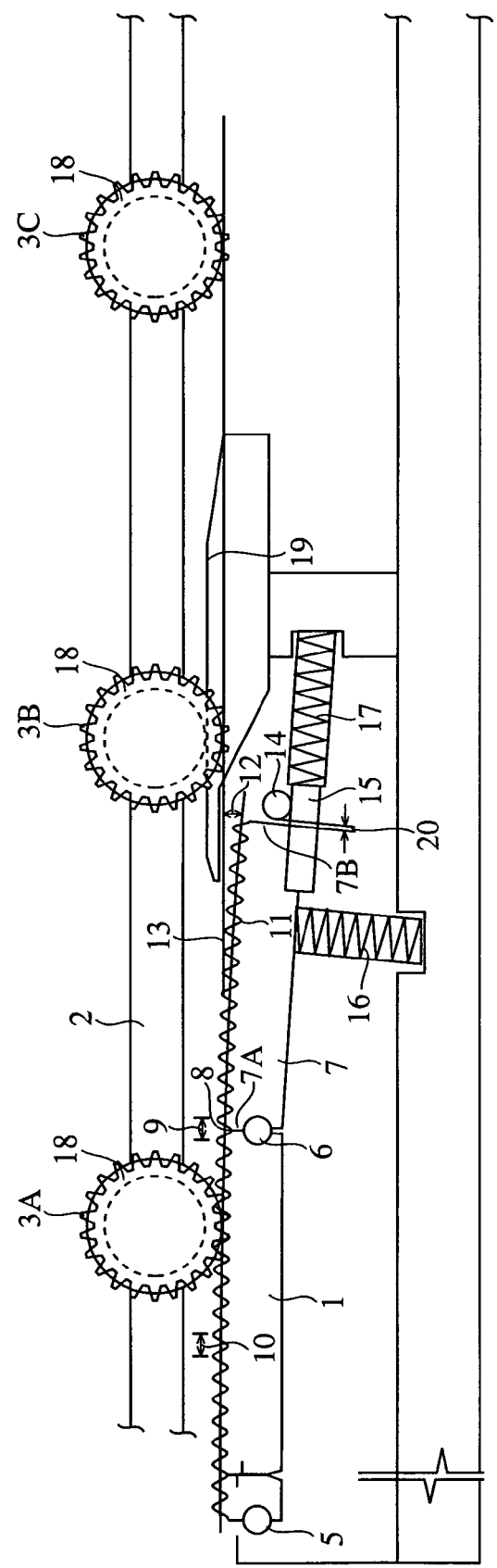
FIG. 1 is a front view to show a constitution of rack and pinion gear mechanism in the prior art technology.

For explaining the present invention in more detail, best mode for carrying out the invention will be described hereinafter with reference to the accompanied drawings.

EMBODIMENT 1

A rack and pinion gear mechanism in accordance with embodiment 1 of the present invention can be applied to, for example, a driving a disk carrying mechanism (not shown in the drawings) which holds a compact disk (hereinafter it is refereed to as "CD") to carry it to a predetermined position and at the same time evacuates from a projection surface of CD when it is in a reproducing state in a CD driving device (not shown in the drawings) by which the reproducing of optical recording media such as CD is performed, however, this embodiment 1 is only an example and the present invention is not limited only to this embodiment 1.

Figure 2:
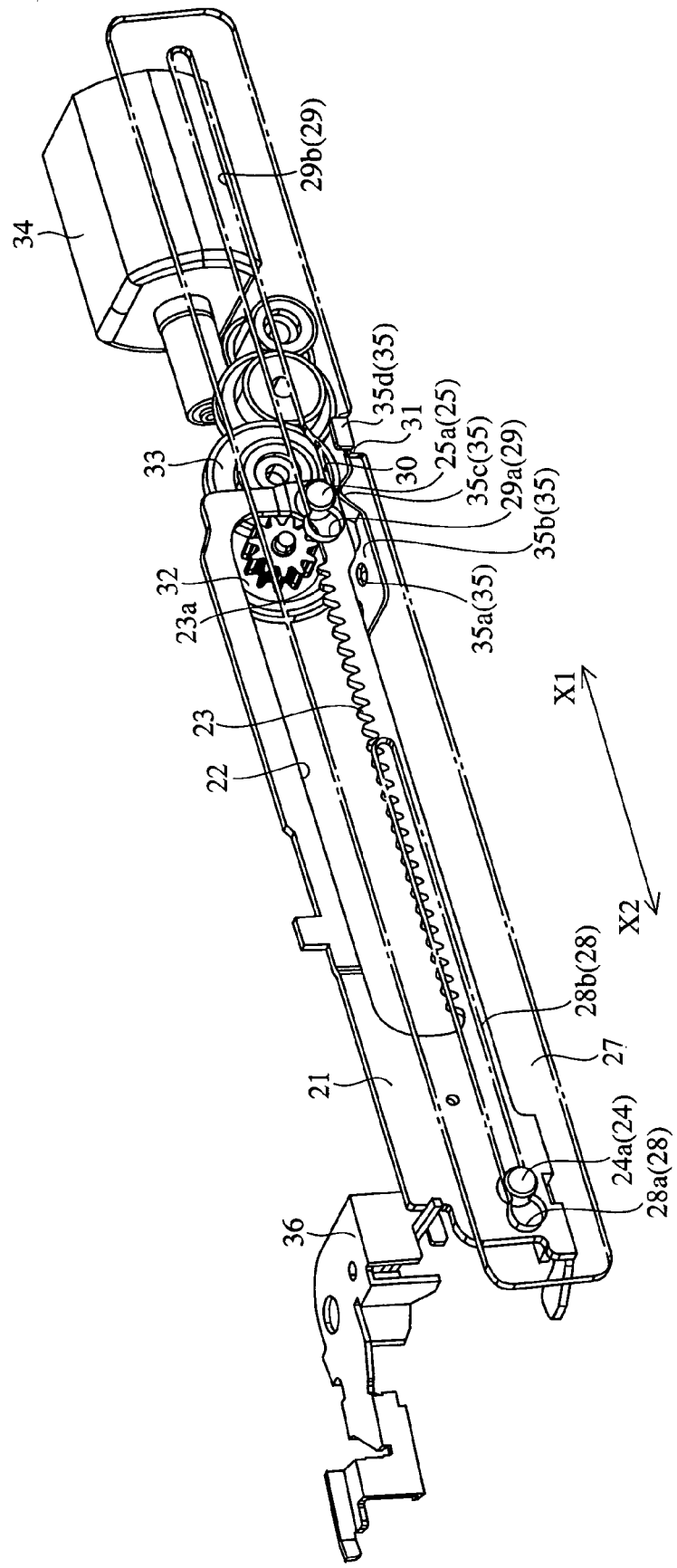
FIG. 2 is a perspective view to show a rack and pinion gear mechanism in accordance with embodiment 1 of the present invention in a state just before an engagement of tooth points occurs.
Figure 3:
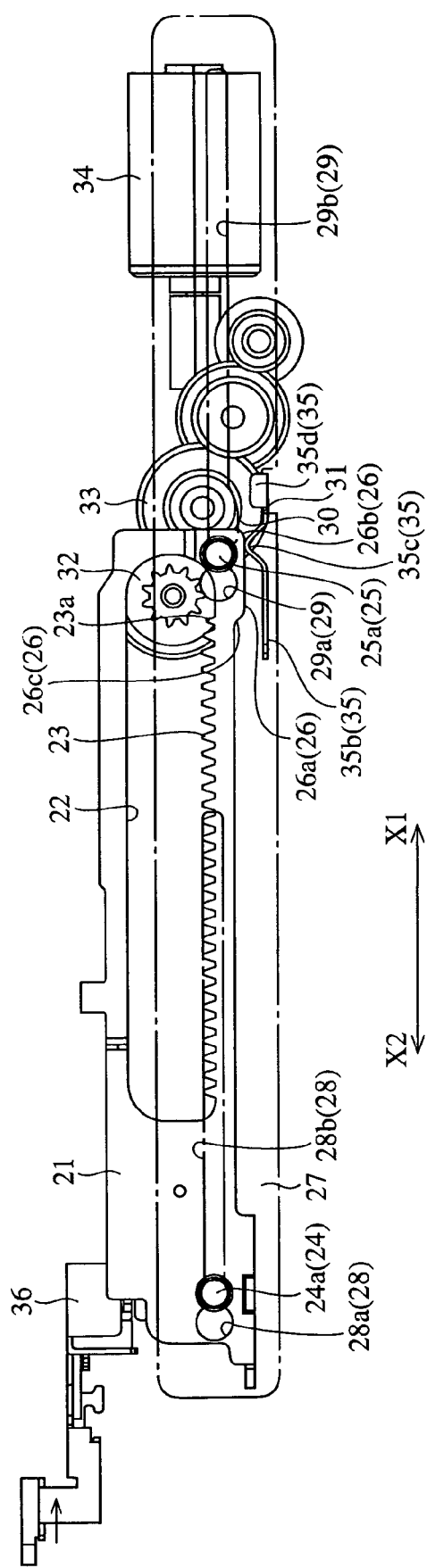
FIG. 3 is a front view of the rack and pinion gear mechanism shown in FIG. 2.
Figure 4:
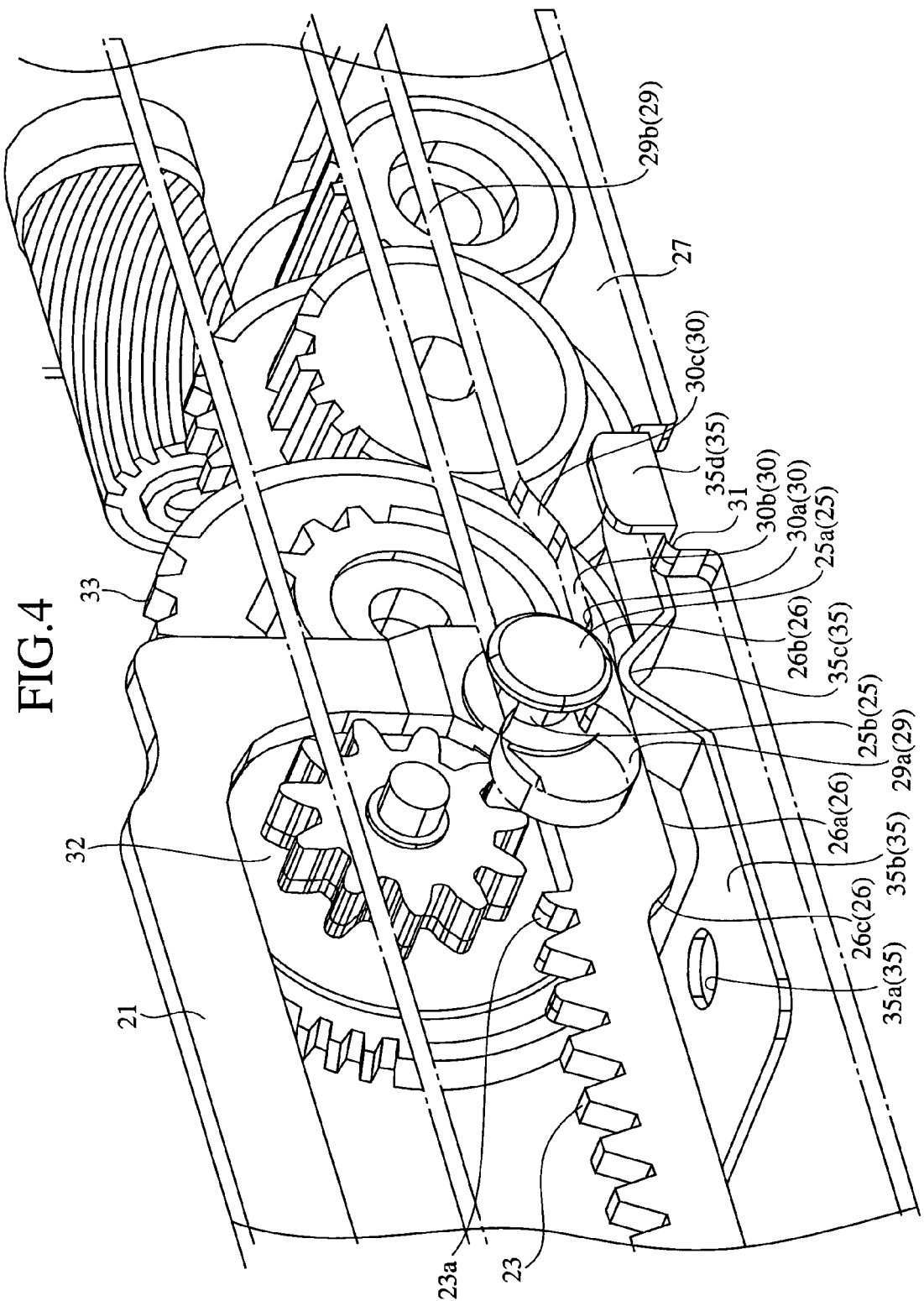
FIG. 4 is an enlarged perspective view to show a relevant part of the rack and pinion gear mechanism shown in FIG. 2.
Figure 5:
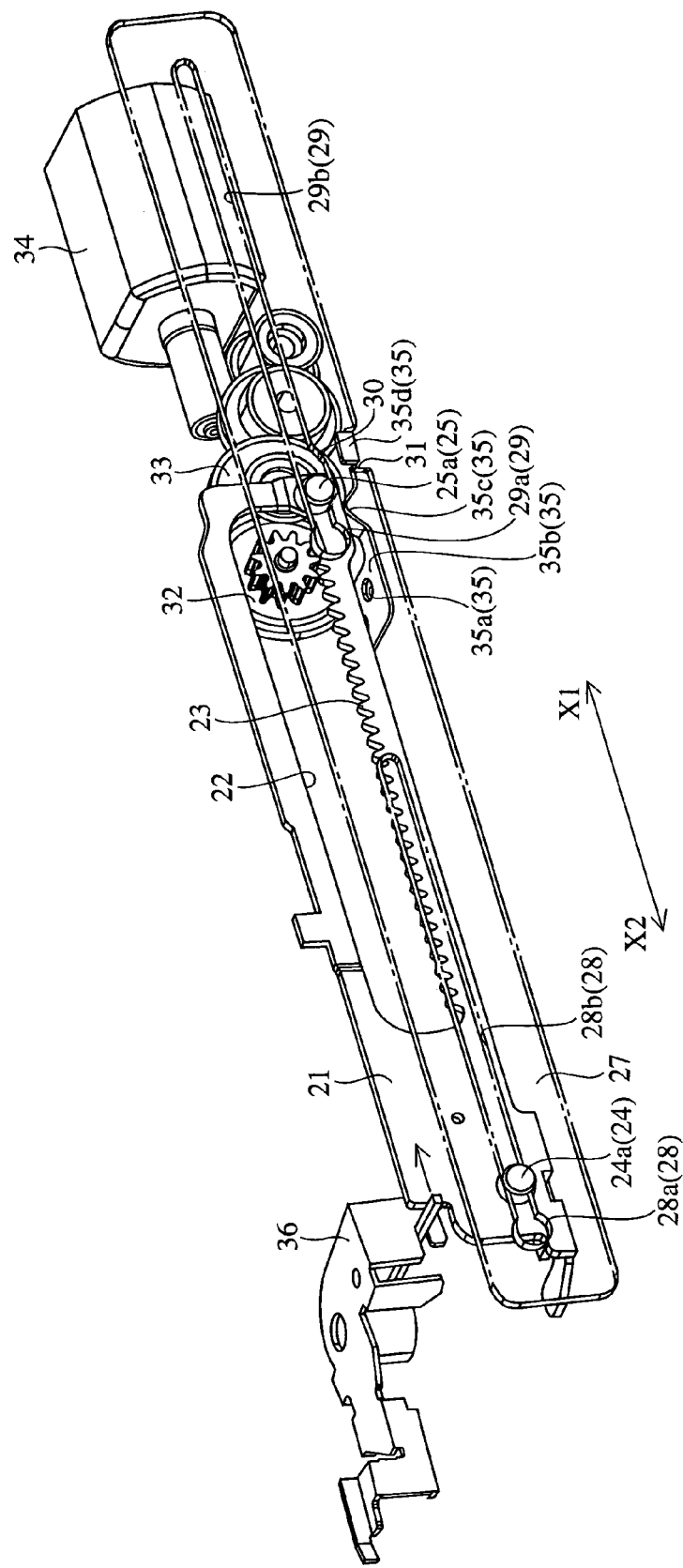
FIG. 5 is a perspective view to show the rack and pinion gear mechanism shown in FIG. 2 to FIG. 4 in a state just after an engagement has been begun without an occurrence of the confliction of tooth points.
Figure 6:
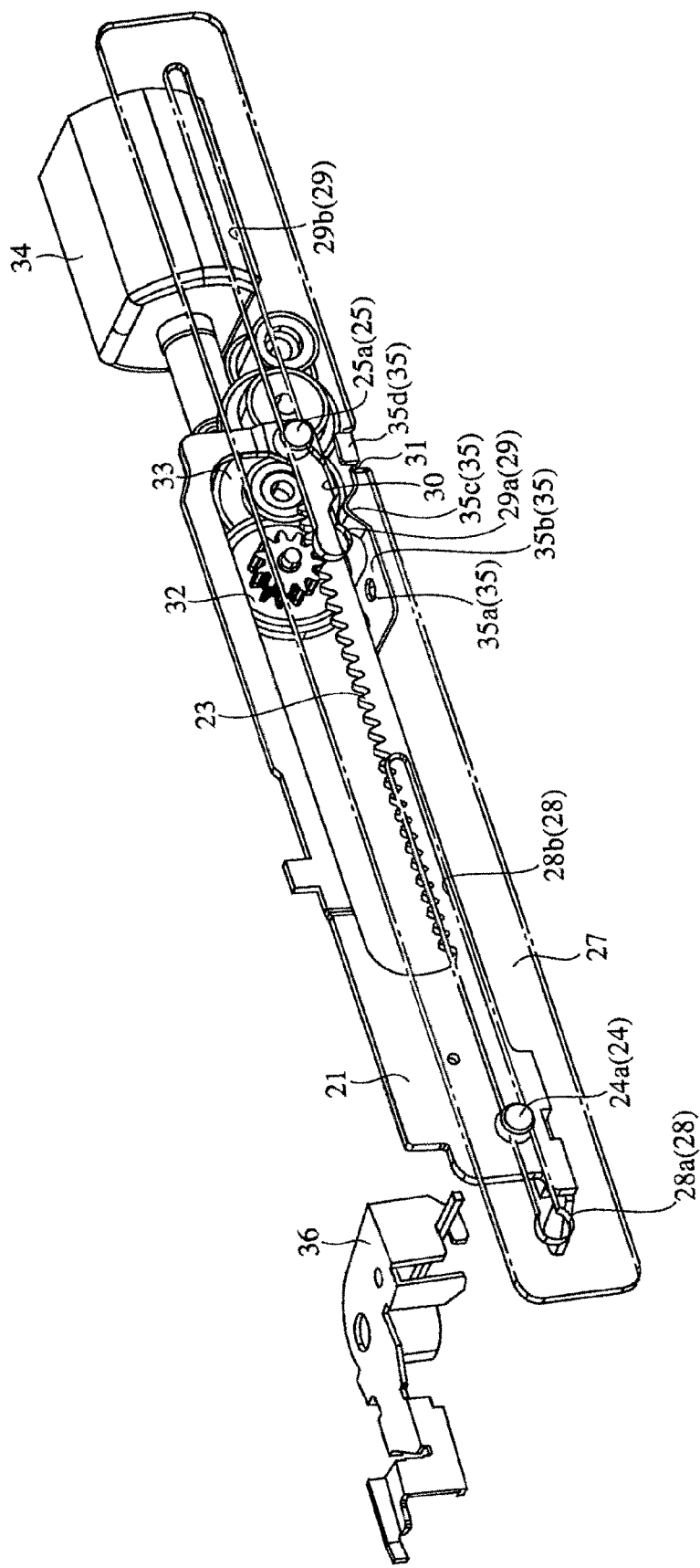
FIG. 6 is a perspective view to show a state that the engagement is proceeded from the state the engagement has been begun as shown in FIG. 5.
Figure 7:
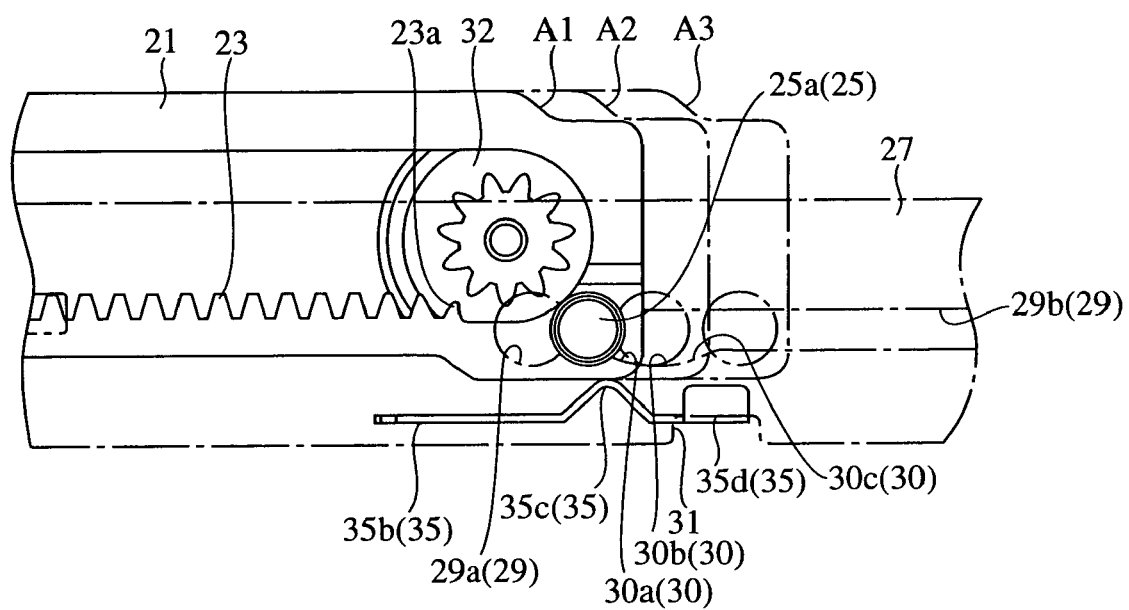
FIG. 7 is a front view to show an action of the rack when it is in the engagement shown in FIG. 5 and FIG. 6.
Figure 8:
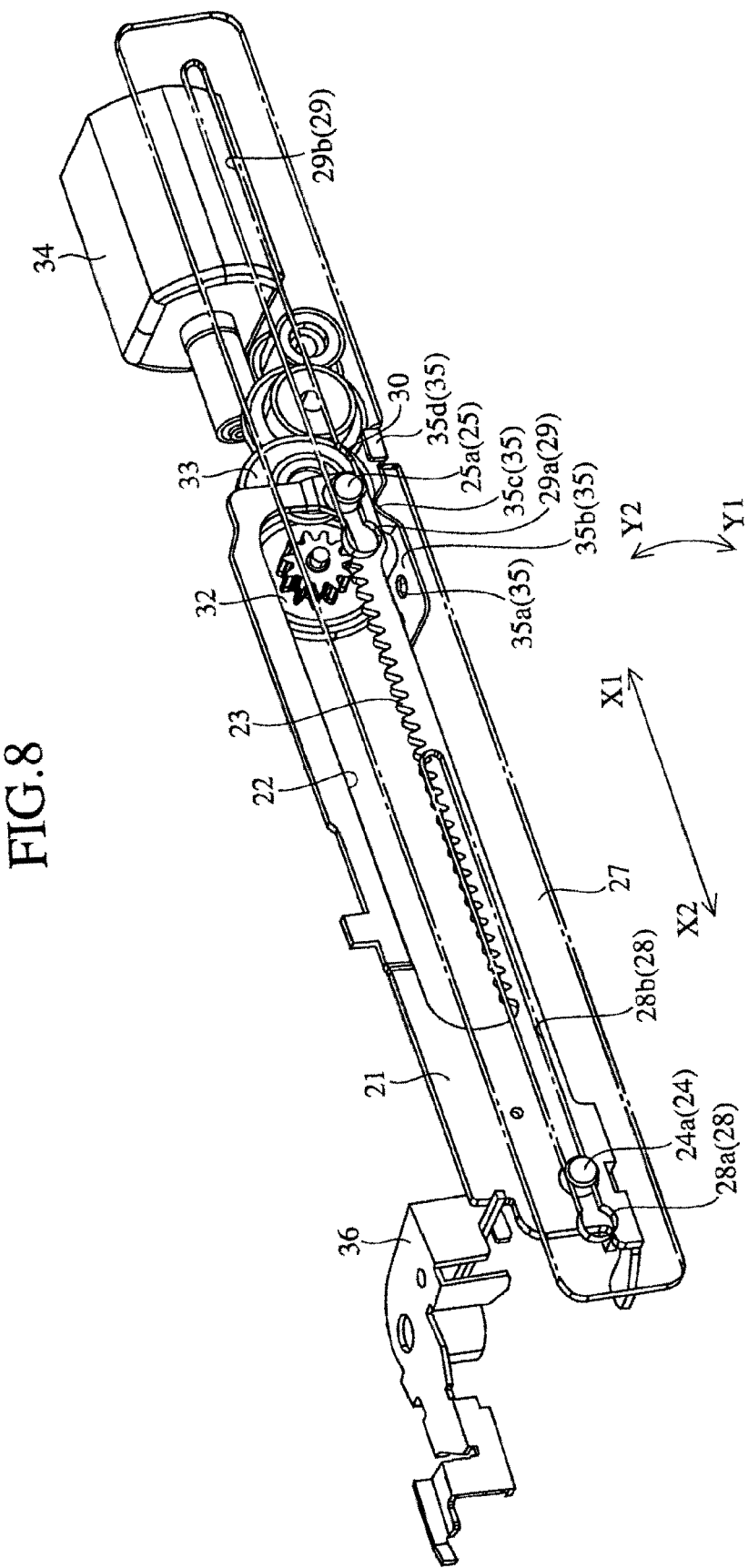
FIG. 8 is a perspective view to show the rack and pinion gear mechanism shown in FIG. 2 to FIG. 4 in a state just after an engagement has been begun with an occurrence of the confliction of tooth points.
Figure 9:
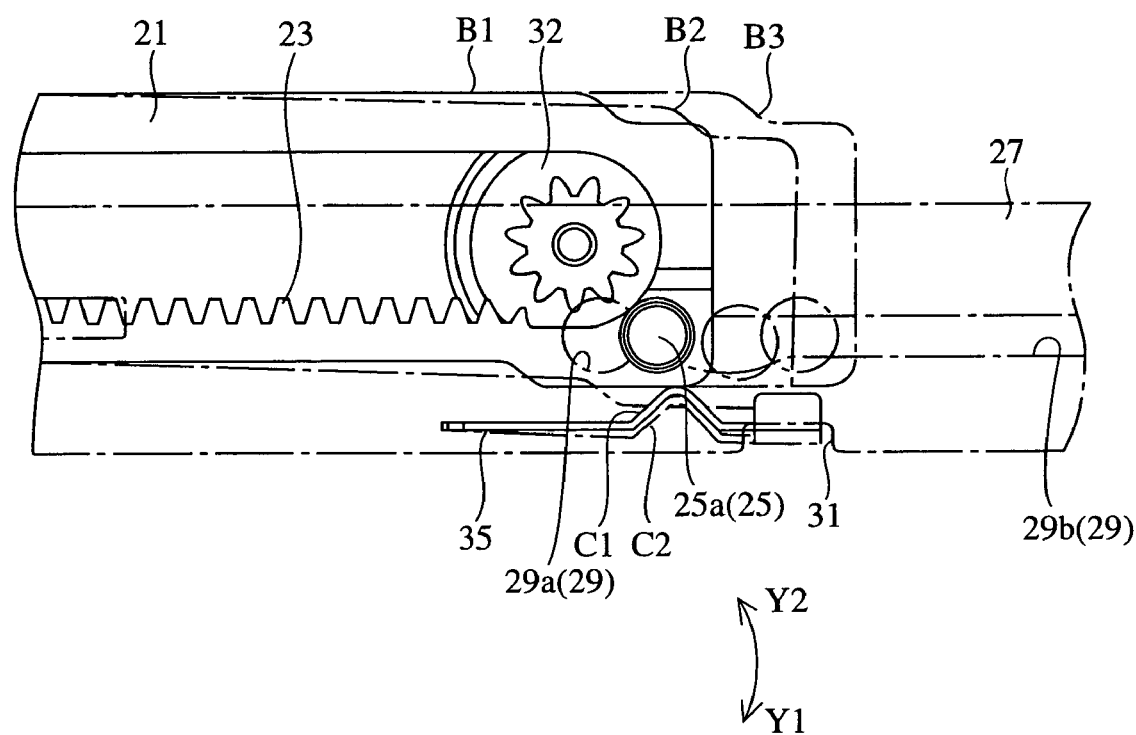
FIG. 9 is a front view to show an action of the rack when it is in a state of the engagement with the confliction of tooth points.

FIG. 2 is a perspective view to show a rack and pinion gear mechanism in accordance with embodiment 1 of the present invention in a state just before an engagement of tooth points occurs, and FIG. 3 is a front view of the rack and pinion gear mechanism shown in FIG. 2. FIG. 4 is an enlarged perspective view to show a relevant part of the rack and pinion gear mechanism shown in FIG. 2, and FIG. 5 is a perspective view to show the rack and pinion gear mechanism shown in FIG. 2 to FIG. 4 in a state just after an engagement has been begun without an occurrence of the confliction of tooth points. FIG. 6 is a perspective view to show a state that the engagement is proceeded from the state the engagement has been begun as shown in FIG. 5, and FIG. 7 is a front view to show an action of the rack when it is in the engagement shown in FIG. 5 and FIG. 6. FIG. 8 is a perspective view to show the rack and pinion gear mechanism shown in FIG. 2 to FIG. 4 in a state just after an engagement has been begun with an occurrence of the confliction of tooth points, and FIG. 9 is a front view to show an action of the rack when it is in a state of the engagement with the confliction of tooth points. At this point in the drawings an end portion of rack which is nearer to a pinion gear is called as a "front end" and an end portion of the rack which is farther to the pinion gear is called as a "back end" as far as it is not especially refereed.

In the drawings a reference numeral 21 designates a rack plate which has a long plate shape. In an inside front of the rack plate 21 a continuos length of opening portion 22 is made in a position which is near to the pinion gear that will be described later. A width of this opening portion 22 is made wider than an outer diameter of the pinion gear (diameter of addendum circle) that will be described later. In a under edge portion of the opening portion 22 a rack 23 is made which is composed of an arrangement of teeth that is disposed along a straight line. In this embodiment 1, the rack is made such that height of a first tooth 23a of the rack 23 (tooth height) is lower than the other teeth in order to absorb a confliction of tooth points between the rack 23 and a pinion gear that will be described later.

In the rack plate constituted as described above, a back side guiding pin 24 and a front side guiding pin 25 which are separated each other along its long direction, are disposed at a surface opposing to a mounting table that will be described later. The back side guiding pin 24 is disposed at a back position which is apart from the opening portion 22, and the front side guiding pin 25 is disposed at a front position which is near to the opening portion 22. These back side guiding pin 24 and front side guiding pin 25 are respectively composed of a head portion 24a and 25a which have a large outer diameter and a foot portion 24b and 25b (not shown) which have a smaller outer diameter than the head portions.

Also in a lower front portion of the rack plate 21, a sliding portion 26 is formed, which slides and contacts with an elastic member that will be described later. This sliding portion 26 is composed of a sliding surface 26a which receives a sliding by the elastic member that will be described later, a front curved surface 26b which is formed in front of the sliding surface 26a to absorb a mechanical shock by a contact with the elastic member that will be described later when the rack plate 21 moves forward, and a back curved surface 26c which is formed at the back of the above mentioned sliding surface 26a to absorb the mechanical shock by the contact with the elastic member that will be described later when the rack plate 21 moves backward.

A reference numeral 27 designates the mounting table having a long plate shape, and the mounting table is formed on a chassis (not shown) of the above mentioned CD driving device (not shown).

The mounting table 27 has two guiding grooves which are a back side guiding groove 28 and a front side guiding groove 29 and they are extending along their long direction and separated each other along the same direction. The back side guiding groove 28 is mainly composed of a circular groove portion 28a through which head portion 24a of the back side guiding pin 24 can be inserted, and a straight groove portion 28b which is formed continuously to the circular groove portion 28a having a width that is defined within a range between outer diameters of the head portion 24a and the foot portion 24b of the back side guiding pin 24.

Also the front side guiding groove 29 is mainly composed of a circular groove portion 29a through which head portion 25a of the front side guiding pin 25 can be inserted, and a straight groove portion 29b which is formed continuously to the circular groove portion 29a having a width that is defined within a range between outer diameters of the head portion 25a and the foot portion 25b of the front side guiding pin 25. In this respect in the straight groove portion 29b there is provided a concave portion 30 at a position where the circular groove portion 29a is adjoining. The concave portion 30 is composed of a falling portion 30a which falls from the straight groove portion 29b, a flat portion 30b which is formed continuously to a lowest portion of the flat portion 30a and is parallel to the straight groove portion 29b, and a rising portion 30c which is formed continuously to the flat portion 30b and rises to the straight groove portion 29b. At this point a distance between an upper edge portion of the straight groove portion 29b and the flat portion 30b of the concave portion 30 is defined smaller than the outer diameter of head portion 25a of the front side guiding pin 25.

At a lower edge portion of the mounting table 27, a concave portion 31 is provided in a vicinity of the above mentioned concave portion 30 to perform a height adjusting of the elastic member that will be described later.

On the mounting table 27 constituted as described above, a pinion gear 32 is rotatably fixed to be made enable to engage with the rack 23 of rack plate 21. At the same time on the mounting table 27 a driving motor 34 to transfer a driving force through a series of idler gears 33 to the pinion gear 32.

Also on the mounting table 27 a leaf spring (elastic member) 35 is attached in a cantilever manner. This leaf spring 35 is composed of a base portion 35b which has a screw hole 35a for a fixing screw (not shown) to fasten the leaf spring 35 onto the mounting table 27, a protruding portion 35c having an inverted V shape which is formed in a free end side that is extending forward from the base portion 35b, and a engaging portion 35d which is formed continuously to the protruding portion 35c to engage with the concave portion 31 of mounting table 27. The leaf spring 35 is supported at the base portion 35b by the mounting table 27 and it is set such that the protruding portion 35c urges the rack plate 21 always upward. However, by means that the engaging portion 35d of the leaf spring 35 is engaged with the concave portion 31 of mounting table 27, a urging of 21 by the protruding portion 35c of leaf spring 35 is regulated in a level that the rack plate 21 slightly contacts with the protruding portion 35c and the rack plate 21 is slidable without any large load, thereby a height of the protruding portion 35c is regulated. At the same time because the back side guiding pin 24 and the front side guiding pin 25 are not pushed to respective upper edge portions of the back side guiding groove 28 and the front side guiding groove 29, respective large sliding loads to the back side guiding pin 24 and front side guiding pin 25 can be avoided.

A reference numeral 36 designates a trigger. When at a timing that, for example, a CD is carried to a reproducing position or to a exchanging position, a command is initiated from a CPU (not shown), the trigger 36 pushes a back end portion of the rack plate 21 forward to engage the rack 23 and the pinion gear 32, thereby it encourages a beginning of action for a rack and pinion gear mechanism which is constituted as above described.

Hereinafter an operation of the mechanism will be explained.

At first before an operation is initiated, the back side guiding pin 24 and the front side guiding pin 25 of rack plate 21 are supported in a state that they are inserted into the circular groove portions 28a and 29a of back side guiding groove 28 and front side guiding groove 29.

Next as shown in FIG. 2 to FIG. 4, when at a timing, for example, CD is carried to a reproducing position or to a exchanging position, a command is initiated from the CPU (not shown), the trigger 36 pushes back end portion of the rack plate 21 forward. After the trigger 36 pushes the rack plate 21, the driving motor 34 begins a driving by a command from the CPU (not shown) as well, the driving force is transferred through the series of idler gears 33 to begin a rotation of the pinion gear 32. When the rack plate 21 begins to go forward along an arrow X1 direction by the above mentioned pushing of trigger 36, a first tooth 23a of the rack 23 and the pinion gear 32 begins to contact. In this respect by this embodiment 1 of the present invention because the tooth height of the first tooth 23a of rack 23 is made lower than other teeth of the rack 23, the confliction of tooth points can be reduced as much as possible thereby a smooth engagement can be realized.

By this arrangement, the confliction of tooth points is not generated usually in this embodiment between the rack 23 and the pinion gear 32. In this case respective teeth tops are deeply inserted to respective root of teeth, a smooth engagement is achieved. By this engagement the rack plate 21 is carried forward along the direction of arrow X1, and the back side guiding pin 24 and the front side guiding pin 25 are guided along the back side guiding groove 28 and the front side 29. At just before and just after beginning of the engagement, because the protruding portion 35c of leaf spring 35 supports the rack plate 21 with sliding and contacting onto the sliding portion 26, the front side guiding pin 25 can pass over the concave portion 30 of front side guiding groove 29 and arrives at the straight groove portion 29b. Because the back side guiding pin 24 arrives directly at the straight groove portion 28b from the circular groove portion 28a, a height of whole rack plate 21 is not changed at before and after of the engagement and constant always.

In this respect a reference symbol A1 in FIG. 7 designates a posture and a position of the rack plate 21 just before the engagement corresponding to FIG. 2 to FIG. 4, A2 designates a posture and a position of the rack plate 21 at the engagement corresponding to FIG. 5, and A3 designates a posture and a position of the rack plate 21 just after the engagement corresponding to FIG. 6.

If by any possibility the confliction of tooth points occurred, it can be absorbed by means that the leaf spring is deformed by an elastic deformation caused by a force generated by the confliction of tooth points to rotate the rack plate 21 along a direction shown by an arrow Y1 around the back side guiding pin 24 as a center. By this arrangement malfunction and the like by the confliction of tooth points is avoided. Just after the absorption of occurrence of confliction, the rack plate 21 in a state of rotation is reset to an original position along a direction shown by an arrow Y2 by an elastic reset of the leaf spring 35. By this arrangement the respective teeth tops are deeply inserted to respective root of teeth, thereby the smooth engagement is achieved.

In a state after the rack plate 21 is reset, the protruding portion 35c of leaf spring 35 moves away from sliding portion 26 of the rack plate 21, and the back side guiding pin 24 and the front side guiding pin 25 are guided only by the straight groove portion 28b of back side guiding groove 28 and the straight groove portion 29b of front side guiding groove 29.

In this respect a reference symbol B1 in FIG. 9 designates a posture and a position of the rack plate 21 just before the confliction of tooth points occurs, B2 designates a posture and a position of the rack plate 21 at the confliction of tooth points corresponding to FIG. 8, and B3 designates a posture and a position of the rack plate 21 just after the confliction of tooth points occurs. A reference symbol C1 in FIG. 9 designates a posture and a position of the leaf spring 35 when the rack plate 21 is in a posture and position of B1 and B3, C2 designates a posture and a position of the leaf spring 35 when the rack plate 21 is in a posture and position of B2.

As above described, in any cases when the confliction of tooth points occurs or does not occur, the driving force by the driving motor 34 is transferred to the pinion gear 32 in order to reversely rotate the pinion gear 32 when the rack plate is returned backward along the direction that arrow X2 shows. By this action the rack plate 21 is returned backward, thereby the engagement between the rack 23 and the pinion gear 32 is released at the first tooth 23a of rack 23 side finally, then a backward movement of the rack plate 21 is stopped. As above described when the rack plate 21 is moved backward, a posture and a height of the rack plate 21 are kept from a beginning of backward movement till the pinion gear 32 arrives at the first tooth 23a of rack 23 because the back side guiding pin 24 and the front side guiding pin 25 are guided only by the straight groove portion 28b of the back side guiding groove 28 and by the straight groove portion 29b of the front side guiding groove 29. And at a time point from just before to just after the pinion gear 32 arrives at the first tooth 23a of the rack 23, the posture and the height of rack plate 21 are kept because the sliding portion 26 of rack plate 21 is contacted with the protruding portion 35c of leaf spring 35 ant it is supported, only when the front side guiding pin 25 passes over the concave portion 30 of front guiding groove 29. Accordingly the posture and the height of rack plate 21 are always kept when the rack plate 21 moves backward.

As above described, in accordance with embodiment 1 of the present invention because the gear mechanism is constituted such that the leaf spring 35 is provided as the elastic member, though it has merely a simple constitution in comparison with the gear mechanism in the prior art technology, the leaf spring 35 can be deformed by the elastic deformation corresponding to a displacement (rotating movement) of the rack plate 21 having the rack 23 when the confliction of tooth points occurs at very beginning of the engagement between the rack 23 and the pinion gear 32, an effect is produced that an occurrence of disadvantages such as a damage of driving motor, a breakage of teeth and the like caused by the confliction of tooth points can be avoided.

In accordance with embodiment 1 of the present invention an effect is produced that the rack plate 21 which is shifted with an elastic deformation of the leaf spring 35 in order to absorb the confliction of tooth points, can be surely reset at the original position utilizing an elasticity of the leaf spring 35 because the leaf spring 35 is arranged to be apart from the rack plate 21 just before and after a beginning of the engagement between the rack 23 and the pinion gear 32, and at the same time the contact between the leaf spring 35 and the rack plate 21 can be avoided to suppress the sliding load as low as possible when the rack 23 and the pinion gear 32 are engaged each other.

In accordance with embodiment 1 of the present invention a height of the protruding portion 35c can be adjusted in order that the protruding portion 35c is slightly contacted with the sliding portion 26 of rack plate 21 just before and just after beginning of the engagement because it is constituted that the concave portion 31 is formed on the mounting table 27 as a positioning means by which the leaf spring 35 is fixed in a cantilever manner and defines a positioning of the protruding portion 35c of free end side of the leaf spring 35 in height. By this arrangement an effect is produced that a decrease of durability in operation can be avoidable because the sliding load of protruding portion 35c against the rack plate 21 can be suppressed as low as possible.

In accordance with embodiment 1 of the present invention an effect is produced that occurrence of the confliction of tooth points can be decreased and the smooth engagement can be attained because a height of the first tooth 23a of rack 23 is made lower than the other teeth of the rack 23, which contacts firstly with a tooth of the pinion gear 32 when the engagement with the pinion gear 32 is achieved.

INDUSTRIAL APPLICABILITY

As set forth above, the present invention provides the rack and pinion gear mechanism by which the engagement and its release are achieved between the rack and the pinion gear, and the present invention is applicable, for example, in a CD driving device for driving of disk conveying mechanism which holds CD to carry to a predetermined position, and at the same time evacuates from a projection surface of CD when it is in a reproducing state.

What is claimed is:

1. A rack and pinion gear mechanism comprising:
    a rack forming member having a rack with a plurality of teeth formed on a first edge of said rack forming member;
    a pinion gear which engages releasably with said rack of said rack forming member; and
    an elastic member which contacts with one portion of said rack forming member, which is located on an opposite side to a tooth of the rack that contacts firstly with a tooth of said pinion gear and is deformed by an elastic deformation corresponding to a displacement of the rack forming member by a confliction of tooth points, wherein the rack forming member includes a sliding member that has a front curved surface located adjacent tooth of the rack that first contacts with the tooth of said pinion, and a flat surface extending from the front curved surface to a back curved surface, the rack forming member only engaging the elastic member at the sliding member.

2. The rack and pinion gear mechanism according to claim 1 wherein said elastic member contacts with the sliding member said rack forming member at just before and just after the beginning of the engagement between the rack and the pinion gear, and the elastic member is apart from the rack forming member when the engagement is continued.

3. The rack and pinion gear mechanism according to claim 2 further comprising a positioning means to fix the elastic member in a cantilever manner to define a positioning of a free end of the elastic member in height.

4. The rack and pinion gear mechanism according to claim 1 wherein said tooth of the rack which firstly contacts with said tooth of said pinion gear at the engagement with the pinion gear is shorter in height than the other teeth.

* * * * *